US007774753B1

(12) United States Patent
Reilly et al.

(10) Patent No.: US 7,774,753 B1
(45) Date of Patent: Aug. 10, 2010

(54) SYSTEM AND METHOD FOR COMMUNICATING DATA AMONG TWO OR MORE PROGRAMS

(75) Inventors: Thomas Reilly, San Francisco, CA (US); Kevin Lynch, San Francisco, CA (US); Ethan Malasky, San Francisco, CA (US); Alexander Magee, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1203 days.

(21) Appl. No.: 11/282,916

(22) Filed: Nov. 18, 2005

Related U.S. Application Data

(60) Provisional application No. 60/629,454, filed on Nov. 18, 2004, provisional application No. 60/629,455, filed on Nov. 18, 2004, provisional application No. 60/629,503, filed on Nov. 18, 2004.

(51) Int. Cl.
*G06F 9/44* (2006.01)
*G06F 3/048* (2006.01)
(52) U.S. Cl. ...................... 717/120; 715/770
(58) Field of Classification Search ................. 719/313, 719/320; 717/103, 120–123; 715/769, 770
See application file for complete search history.

(56) References Cited

U.S. PATENT DOCUMENTS

| 5,157,763 | A | * | 10/1992 | Peters et al. ................. 715/769 |
|---|---|---|---|---|
| 5,301,268 | A | * | 4/1994 | Takeda ........................ 719/329 |
| 5,606,674 | A | * | 2/1997 | Root .......................... 715/769 |
| 5,625,809 | A | * | 4/1997 | Dysart et al. ............. 707/103 R |
| 5,694,563 | A | * | 12/1997 | Belfiore et al. ............... 715/821 |
| 5,781,192 | A | * | 7/1998 | Kodimer ...................... 715/770 |
| 5,801,693 | A | * | 9/1998 | Bailey ......................... 715/769 |
| 5,886,699 | A | * | 3/1999 | Belfiore et al. ............... 715/843 |
| 5,924,099 | A | * | 7/1999 | Guzak et al. ................. 707/100 |
| 6,061,058 | A | * | 5/2000 | Owens et al. ................ 715/769 |
| 6,212,577 | B1 | * | 4/2001 | Stern et al. ................... 719/329 |
| 6,535,930 | B2 | * | 3/2003 | Stern et al. ................... 719/329 |
| 6,687,745 | B1 | * | 2/2004 | Franco et al. ................ 709/219 |
| 6,803,929 | B2 | * | 10/2004 | Hinegardner et al. ....... 715/769 |
| 6,807,668 | B2 | * | 10/2004 | Stern et al. ................... 719/329 |
| 6,839,714 | B2 | * | 1/2005 | Wheeler et al. ............. 707/102 |
| 6,904,569 | B1 | * | 6/2005 | Anderson .................... 715/851 |
| 6,944,821 | B1 | * | 9/2005 | Bates et al. .................. 715/209 |
| 6,961,907 | B1 | * | 11/2005 | Bailey ......................... 715/770 |
| 7,293,242 | B2 | * | 11/2007 | Cossey et al. ............... 715/770 |

(Continued)

*Primary Examiner*—Wei Y Zhen
*Assistant Examiner*—Qing Chen
(74) *Attorney, Agent, or Firm*—Fish & Richardson P.C.

(57) ABSTRACT

Systems and methods communicate data selected from one program to another program or component of another program. A system can receive an identifier of at least one type of data each of a plurality of programs can receive. The system can store the identifiers and can receive a data selection command relative to one of the plurality of programs via a user interface. The system can also receive, in response to the obtained data selection command, data associated with the data selection command and an identifier of the type of the data associated with the data selection command. The system can also identify at least one other program in the plurality of programs whose identifier matches the identifier of the type of data received, and can provide, based on input, the data received to at least one of the at least one other program in the plurality of programs identified.

13 Claims, 3 Drawing Sheets

U.S. PATENT DOCUMENTS

| | | | |
|---|---|---|---|
| 7,296,244 B2 * | 11/2007 | Martinez et al. | 715/861 |
| 7,310,781 B2 * | 12/2007 | Chen et al. | 715/769 |
| 7,386,841 B2 * | 6/2008 | Huang et al. | 717/141 |
| 7,478,336 B2 * | 1/2009 | Chen et al. | 715/770 |
| 2002/0080179 A1 * | 6/2002 | Okabe et al. | 345/769 |
| 2004/0172584 A1 * | 9/2004 | Jones et al. | 715/500 |
| 2005/0172241 A1 * | 8/2005 | Daniels et al. | 715/770 |
| 2005/0198581 A1 * | 9/2005 | Soderberg et al. | 715/770 |
| 2005/0210401 A1 * | 9/2005 | Ketola et al. | 715/770 |
| 2005/0262521 A1 * | 11/2005 | Kesavarapu | 719/320 |
| 2006/0085796 A1 * | 4/2006 | Hoerle et al. | 719/313 |

* cited by examiner

SYSTEM AND METHOD FOR COMMUNICATING DATA AMONG TWO OR MORE PROGRAMS

RELATED APPLICATIONS

This application claims the benefit of U.S. provisional application Ser. No. 60/629,454 entitled, "SYSTEM AND METHOD FOR PROVIDING NOTICES TO USERS OF A COMPUTER PROGRAM IN A FLEXIBLE WAY" filed on Nov. 18, 2004 by Ethan Malasky, Stephanie Goss, Kevin Lynch, David Calaprice and Alexander Magee; U.S. provisional application Ser. No. 60/629,455 entitled, "METHOD AND APPARATUS FOR COMMUNICATING DATA AMONG TWO OR MORE PROGRAMS" filed on Nov. 18, 2004 by Thomas Reilly, Kevin Lynch, Ethan Malasky and Alexander Magee; and U.S. provisional application Ser. No. 60/629,503, entitled "METHOD AND APPARATUS FOR COMMUNICATING INSTANT MESSAGE INFORMATION BETWEEN AN INSTANT MESSAGING NODE AND ONE OR MORE PROGRAMS" filed on Nov. 18, 2004 By Daniel Dura and Kevin Lynch, each having the same assignee as the present application and each is incorporated by reference herein in its entirety.

The subject matter of this application is related to the subject matter of U.S. patent application Ser. No. 11/090,402 entitled, "System and Method for Communicating Information Over a Network" filed on Mar. 25, 2005 by Kevin Lynch, David Calaprice, Ethan Malasky and Tracy Stampfli, and U.S. patent application Ser. No. 11/089,699, entitled, System and Method for Installing One or More Programs and at Least a Portion of Their Environment" filed on Mar. 25, 2005 by Kevin Lynch, Tracy Stampfli, Peter Grandmaison and Rebekah Hash, and U.S. patent application Ser. No. 11/090,741 entitled, "System and Method for Updating One or More Programs and Their Environment" filed on Mar. 25, 2005 by Tracy Stampfli and Rebekah Hash, each having the same assignee as this application and all are hereby incorporated herein by reference in its entirety.

FIELD OF THE INVENTION

The present invention is related to computer software and more specifically to computer software for inter-program transfer of data.

BACKGROUND OF THE INVENTION

Conventional computer programs store data. Data can be transferred between programs automatically using conventional communications techniques, or it can be transferred by a user. When the user of one program desires to transfer data to another program, the user can use fairly primitive methods of transferring the data, such as manually retyping the data from one program to the next.

The use of a clipboard can simplify this process somewhat. A "clipboard" is one or more areas of storage into which data from one program may be copied or cut, along with a designator of one of a limited number of types of the data, such as text, or bitmap and that is accessible to other programs for pasting. The user uses the clipboard in the WINDOWS operating system by cutting or copying data from the source program, and then pasting the cut or copied data into the destination program at the desired location. The destination program is provided access to the contents of the clipboard and can accept it and process the contents.

The use of a clipboard makes it somewhat easier to transfer data from one program to another, however, there are several problems with a conventional clipboard. First, the clipboard allows the transfer of data as a single blob. If the user wants to use the clipboard to copy a name and address from one program, the name and individual components of the address must be copied one at a time, requiring the user to implement a cumbersome back and forth movement between the two programs.

Second, the user receives no indication that the program into which the data is being pasted can actually receive the data prior to pasting it. For example, a destination program may not be able to accept for pasting a bitmap stored in the clipboard. In many cases, only way for the user to figure this out is by trial and error. For example, the user will attempt to paste the data into the program, assume there has been an error, try to paste again, and when that doesn't work, assume there has been a problem with the cut or copy and repeat the process until the user finally figures out that the paste simply isn't going to work.

Third, there is no way that the authors of the sending and receiving programs can agree to allow new types of data, beyond the limited data types allowed by the operating system, to be pasted via the clipboard. If a "name and address" data type were allowed to be specified by the program providing the data described above, the program into which the data was being pasted could determine that what was being pasted was a name and address, and could parse the fields (e.g. first name, last name, street address line 1, street address line 2, city, state, zip) and receive them into the proper fields in the receiving program. Because of the limited data types specified by conventional clipboards, such an arrangement is not possible. Furthermore, as different programs are used to supply different types of data, the types of data permitted to be provided and received cannot be altered.

What is needed is a system and method that can allow the transfer of a multi-part data structure under user control in a format other than a single blob of data, can inform the user whether the program to which the user desires to transfer data can accept the data, and can allow programs to define new types of data that can be transferred between them under user control.

SUMMARY OF INVENTION

A system and method allows programs to register data types they can accept via a clipboard-like mechanism. When a user selects data, the program provides the data and its type, the data and type are received, the programs or their components that can accept the data having that type are listed and the user can select any of those programs from the list. The selected program is provided with the data and its type, and can interpret and/or process the data using the type. If a user so indicates, for example, by holding down the control key when the selection is made, the application corresponding to the program receiving the data may be run in a window different from the currently running application, and otherwise, the application corresponding to the program receiving the data is run in the same window as the prior running application.

DETAILED DESCRIPTION OF A PREFERRED EMBODIMENT

Figure 1:
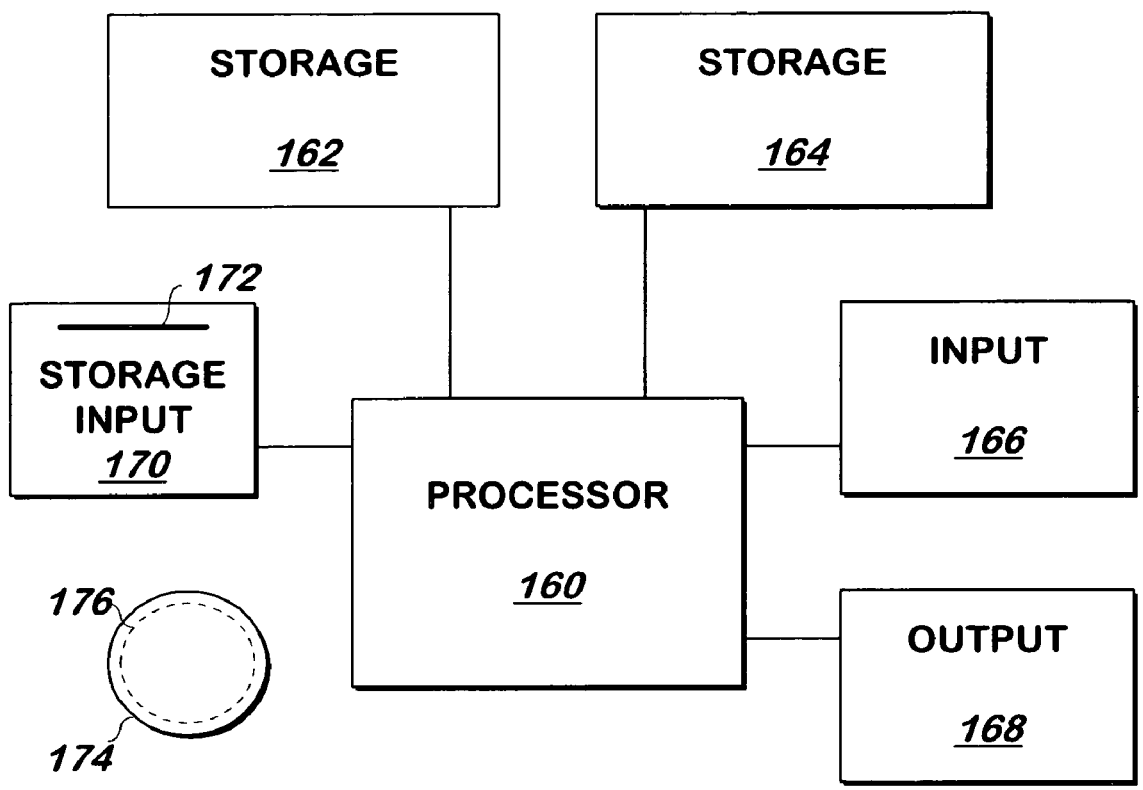
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
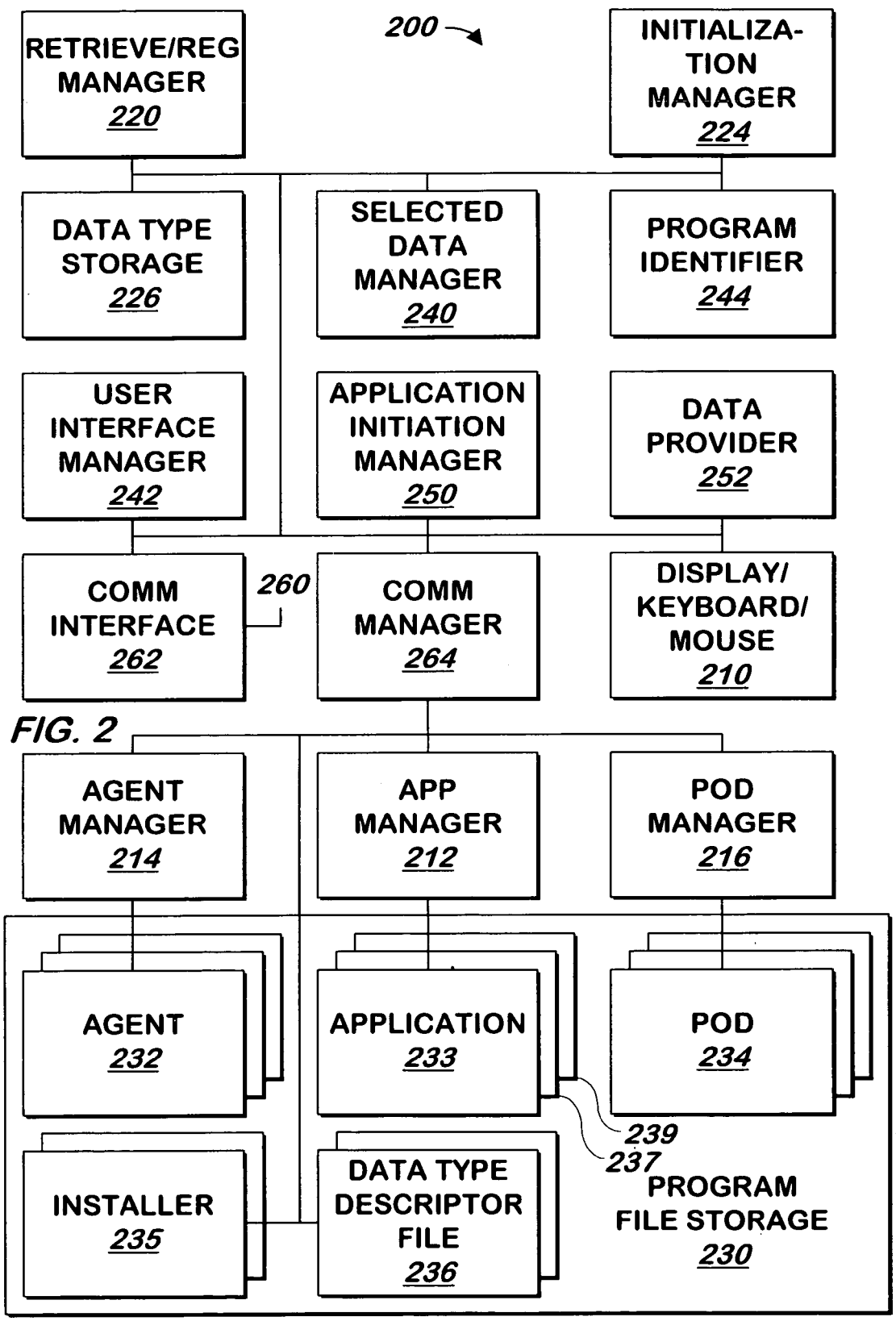
FIG. 2 is a block schematic diagram of a system for communicating data between two or more programs according to one embodiment of the present invention.

Referring now to FIG. 2, a system for communicating data among one or more programs is shown according to one embodiment of the present invention. In one embodiment, all communication into or out of system 200 is made via input/output 260 of communication interface 262 which is coupled to a network such as the Internet or a local area network or both. Communication interface 210 may include a conventional communication interface that supports TCP/IP, Ethernet or other conventional communication protocols and may communicate with a user via appropriate drivers for conventional display/keyboard mouse 210.

System Initialization.

In one embodiment, system 200 allows the installation of one or more programs into system 200. Each such program may operate as a conventional program described in the related application. As described in more detail below, each program installed in system 200 includes a data type descriptor file 236 that describes the data types that the corresponding program can accept and process, as described in more detail below.

When the system starts up, initialization manager 224 reads, via communication manager 264, each data type descriptor file 236 already stored in program file storage 230. A data type descriptor file may be identified by its filename, such as file having a particular name or extension that is stored in a directory containing files corresponding to a particular program, or all installed programs and such files may be arranged into subdirectories of such directory, with one subdirectory per program. Initialization manager 224 reads the data type descriptor files, such as data type descriptor file 236, for each installed program, by scanning each such subdirectory in program file storage 230 of the given directory and looking for files having the particular name or extension. Program file storage 230 may be disk or memory storage or both and may contain a conventional database.

As described in more detail below, each data type descriptor file 236 specifies the types of data the corresponding program is able to interpret and utilize, as well as a filename corresponding to the application for that program (or the filename of the application may be specified using other means, such as via a manifest, which initialization manager 224 may also read, or the filename of the application for the program may be implied using a particular filename or extension that all programs use for their applications. For example, one such data type may be "address" where the data may consist of a street address line 1, street address line 2, city, state, and zip code.

In one embodiment, the data type descriptor file for a program is arranged as a text file in XML format, with the name "Product.xml". In one embodiment, each program component has its own XML element, with XML elements corresponding to pods and agents being nested within the XML element for the application for that program. The name of the program element is followed by a list of the data types that the program element can read, such name and list being the contents of each XML element.

As initialization manager 224 reads each data type descriptor file 236 as described above, initialization manager 224 stores, in data type storage 226, the information from each data type descriptor file 236 into a Blast data structure, described in more detail below. Data type storage 226 may be disk or memory storage or both and may consist of a conventional database. The use of the Blast data structure is described in more detail below.

The blast data structure lists all of the data types specified in a data type descriptor file, and, for each data type, the component or components that were specified in a data type descriptor file as being able to process data of that type.

Installation of Application

In one embodiment, other non-installed programs may be installed during the operation of system 200 and the information from their data type descriptor files may be read and added to data type storage 226 in the same manner as described above as or after any such program is installed.

One embodiment of the installation of programs is described in the related application, and will now be summarized. In one embodiment, application manager 212 may display, via communication interface 262, an icon in display 210 corresponding to installation application 237, which may already be installed. Installation application 237 may be an application capable of locating other applications available for download to, and installation by, system 200.

If the user clicks the icon displayed in display 210 by application manager 212, application manager 212 commences execution of installation application 237.

Once application 237 is started by application manager 212, installation application 237 is displayed in an application window on display 210 and proceeds to retrieve a file (not shown) consisting of a list of program names and the URL of each manifest corresponding to a program on the list. The programs on the list may be those applications already determined (not shown) to be capable of running on system 200 and registered to a server from which installation application 237 retrieves the list. The manifest for a program may be a file listing the URLs of the corresponding files for the program or application as described above and which may be retrieved as described further below. When application 237 has retrieved the file, application 237 then displays the list of program names in display 210 via a user interface it provides via application manager 212 and communication interface 262.

Installation of Applications

The user may then make a selection from the list of programs via keyboard 210, communication interface 262 and the user interface provided by installation application 237 via application manager 212. When the user makes such a selection, application manager 212 receives the selection and provides the selection to installation application. Installation application 237 uses the selection to identify the selected program.

Installation application 237 then locates the manifest file URL corresponding to the selected program. To check for the manifest file URL, installation application 237 searches the file previously retrieved as described above for the URL of the manifest file corresponding to the user-selected program using conventional search methods. When installation application 237 has identified the corresponding manifest file URL, installation application 237 returns the corresponding manifest file URL of the selected application to application manager 212.

Application manager 212 receives the manifest file URL from application 237 and provides the manifest file URL to retrieve/register manager 220 via communication manager 264. Retrieve/register manager 220 receives the manifest file URL from application manager 212, which retrieves the manifest via communication interface 262 using the URL and conventional file retrieval methods.

Retrieve/register manager 220 reads the manifest file and retrieves the files corresponding to the URLs in the manifest via communication interface 262 and input/output 260 using conventional file retrieval methods, such as by retrieving such files via the Internet.

Once retrieve/register manager 220 has retrieved the files specified by the manifest, retrieve/register manager 220 stores the retrieved files in program file storage 230 associated with the manifest file URL as described above via the operating system, such by placing all of the files in a subdirectory of a directory that corresponds to installed programs. If no such subdirectory exists, retrieve/register manager 220 builds the record via the operating system.

In one embodiment, one of the specified files may be an installer 235, which may include a file containing instructions on installing the program, although in one embodiment, the installation of the program is essentially completed when the files have been added to the subdirectory and the data type descriptor file has been read and processed as described herein. The manifest may contain the filename of the corresponding data type descriptor file at a known location, or the data type descriptor file may have a name that identifies the file as a data type descriptor file.

Another Way of Installing a Program

In another embodiment, instead of using installation application 237 to locate a manifest corresponding to a program to install, the user may supply a conventional browser (not shown) with the URL of a page containing a link to a manifest of an application the user desires to install in system 200. The browser receives the URL of the manifest and may check the URL to determine what type of file the manifest file is categorized as. The browser may then search its registry for applications able to work with the manifest file type. In such embodiment, application manager 212 may have previously registered retrieve/register manager 220 with the browser as being able to handle the manifest file type when application manager 212 is installed onto the computer system on which it runs.

If the user clicks, or selects, the link to the manifest file, the browser, using the operating system downloads the manifest file using conventional methods. When the browser has downloaded the manifest file, the browser provides the manifest file to retrieve/register manager 220, which receives the manifest file and stores the manifest file in program file storage 230, via the operating system, in the subdirectory associated with the application corresponding to the manifest file. If no such subdirectory exists, user interface manager 242 builds such a record via the operating system. When user interface manager 242 has stored the manifest file in program file storage 230; user interface manager 242 then processes the manifest file and retrieves the files it references as described above.

The user may use either installation technique or both installation techniques to install as many programs as desired.

Reading the File of Known Data Structures.

When retrieve/register manager 220 has retrieved and stored the manifest and specified files of the program using either technique as described above, retrieve/register manager 220 signals initialization manager 224 with the name of the newly-installed program. In one embodiment, the program contains an application 233, zero or more agents such as agent 232 and zero or more pods, such as pod 234, each described in the related application and each is referred to herein as a "component" of a program, or a program component.

Initialization manager 224 receives the name of the selected program and reads, via communication manager 264, the associated data type descriptor file 236 stored in program file storage 230 by retrieve/register manager 220 as described above. Initialization manager 224 then parses the associated data type descriptor file 236 as described in more detail below, using conventional parsing methods. When initialization manager 224 has read and parsed the data type descriptor file 236, initialization manager 224 adds the information from parsed data type descriptor file 236 to data type storage 226.

In one embodiment, the information in data type storage 226 is arranged such that each data type has a corresponding list of programs and/or program components that are capable of reading that data type, as indicated by their associated data type descriptor file 236.

System and Method is for Automatic Transfer Under Manual Control.

As will now be described, the system and method of the present invention allows a user to perform an automatic transfer of information under manual control by the user, where a user takes action to indicate the data to be transferred, and takes action to indicate the location in the destination to which that data should be transferred and the system and method automatically performs the transfer. In this manner, the user controls the data being retrieved and its destination, yet the system and method handles the details of allowing the user to indicate, and sending the data only to, applications that can handle the type of data corresponding to the data to be transferred.

The User Selects Data.

The user may select a set of data in a program or program component, such as application 233 or a pod, such as pod 234 via communication interface 262 and display/keyboard/mouse 210. To do so, the user may position the mouse cursor within the coordinates of an area containing certain data, and then optionally drag the mouse over the data to be transferred. In one embodiment, the user is not required to drag the mouse over all the data to be transferred; instead, all of the data of the type of data in which the mouse cursor is positioned may be selected by clicking the mouse cursor within or near an area containing data of a given type. For example, the user may place the mouse cursor in an area consisting of fields indicating an address. In such a case, the application or pod displaying that data would determine the user's mouse cursor position and determine that the mouse was within the confines of a set of data conforming to the "address" data type.

In one embodiment, the positions of the mouse cursor and operation of the mouse are communicated by the operating system to application manager 212 when the mouse is positioned over the displayed area of an application, such as application 233, or to pod manager 216 when the mouse is positioned over the displayed area of a pod. Application manager 212 and pod manager 216 register the windows in which applications and pods are displayed, respectively, and the operating system provides notification as well as the coordinates of the mouse cursor to portions of application manager 212 or pod manager when conventional mouse operations are performed (mouse move, mouse over, mouse click, etc.). Application manager 212 displays an application in an area of the window it controls, and pod manager 216 displays zero or more pods, each pod being displayed in an area of the window it controls, and each manager 212, 216 maintains the coordinates of those areas, associated with the application or pod being displayed in that area. When a mouse operation is performed over any such area, the manager 212, 216 receiving notification of that operation provides the notification and the mouse coordinates to the corresponding application or pod being displayed in that area.

And within that area, another area may contain the date the user is selecting, while still other areas within that same area assigned to that same application or pod may contain other data not a part of the data being selected. Such other data may be another instance of the type of data that is being selected or may have another type. The manner of providing the notification may the same or similar to that used by conventional operating systems, where for example, an application 233 registers with application manager 212 event handlers for each mouse operation (as well as other conventional operations) and application manager 212 provides the coordinates of the mouse cursor to the handler registered for a particular operation for the application corresponding to the area in which the operation was performed, based on the type of operation the user performed, as indicated by the operating system. For purposes of example, the notification will be sent to either application 233 or pod 234, but the notification may be sent to any application or pod corresponding to the area in which the mouse operation was performed, as described above.

If the user selects a set of data from application 233 (for example, by clicking within it or by highlighting it), application 233 provides selected data manager 240 with the selected data and an identifier of the corresponding data type via application manager 212 and communication manager 264. For example, if the user clicks or highlights an address, application 233 provides selected data manager 264 with an identifier of the data type "address" and the data itself. In one embodiment, if the user highlights some of the address, only the highlighted portion of the address is provided. If the user highlights all of the address fields (or merely clicks the mouse in any one of them in another embodiment), application 233 provides all of the address data corresponding to the highlighted or clicked data in addition to the identifier of the address data type.

The data may be provided by application 233 in the format of a data structure. For example, the data structure may have XML type tags, or it may be character based, with a certain number of characters corresponding to each field (e.g. address 1, address 2, city, state, zip) in the data structure.

The identifier of the data type is the same identifier (or an identifier that corresponds to such identifier) that other programs will have registered via their data type descriptor files as described above if they can accept that type of data. The identifier and format of each type may be maintained by a central authority in response to requests from program developers, or may simply be published by the program developers individually to allow other program developers to review the types of data they may wish to accept or provide, so as to standardize around types others have already developed. Although such standardization can be helpful, new data types may be continually developed, with developers freely able to employ or disregard the new data types: each program is free to provide or accept data of any number of types.

When it is provided as described above, selected data manager 240 receives the information from the application 233 and stores the selected data and corresponding specified data type identifier in data type storage 226. In one embodiment, selected data manager 240 stores the selected data and corresponding data type in data type storage 226 in a separate record indicated as associated with the selected data.

Although the example above described the selection of data via application 233, in one embodiment the selection of data may be performed in a similar manner using a pod, such as pod 234. The operation is similar to that described above, except that pod 234 performs the operations performed by application 233 in the description above, and pod manager 216 performs the operations performed by application manager 212 in the description above.

Determine which Applications can Handle the Data: Presenting the User with a List.

The user may signal application manager 212 for a list of the programs or program components eligible to receive the selected data described above. In one embodiment, the signal is received by the user clicking on an icon in a border portion of the window used to display a currently selected application. When application manager 212 receives the signal from the user, application manager 212 signals user interface manager 242.

In one embodiment, user interface manager 242 receives the signal from application manager 212 and determines the data type of the most recently selected data based on the selected data record stored in data type storage 226. To do so, user interface manager 242 checks data type storage 226 for the data type of the selected data stored previously by selected data manager 240 as described above. User interface manager 242 reads the selected data type from the selected data record. When user interface manager 242 has read the selected data type identifier from data type storage 226 as described above, user interface manager 242 provides the identifier of the selected data type to program identifier 244.

Program identifier 244 receives the selected data type indication from user interface manager 242 and retrieves the names and optionally, one or more other identifiers of the programs or program components that are capable of interpreting the data type of the most recently selected data provided by user interface manager 242. To do so, program identifier 244 searches data type storage 226 for the data type of the selected data type using conventional search and comparison methods. When program identifier 244 finds the matching data type, program identifier 244 reads the list of programs or program components capable of handling the data type described above and the corresponding filenames and paths of the application of such program or program component. Program identifier 244 then provides user interface manager 242 with the list of identifiers (e.g. names) of all so such programs of receiving data of the type selected as described above.

User interface manager 242 receives the identifiers from program identifier 244 and provides application manager 212 with the names or other identifiers of the one or more programs or program components that registered as being able to interpret the selected data type.

Application manager 212 receives the list of program or program component identifiers from user interface manager 242 and displays the list of identifiers via communication interface 262 on display 210. In one embodiment, application manager 212 displays the list of program or program component identifiers in the form of a pull down menu.

The User Selects the Program and the Corresponding Application is Launched.

The user may select a name or other identifier on the pull down menu or other list of programs or program components provided by application manager 212 as described above. When the user makes a selection, application manager 212 receives the selection. Application manager 212 then provides user interface manager 242 with the name of the newly selected program, as well as an indication of whether the "control" key was pressed at the time the user selected the program.

To determine whether the "control" key was pressed as described above, in one embodiment, application manager 212 is registered with the operating system to be signaled if the control key is pressed while the mouse is clicked or a selection is otherwise made. If application manager 212 receives such a signal, application manager 212 may check the selection made by the user to determine if the selection was made for a program while the control key was pressed as described above using conventional methods. If such a selection was made for a program, determined by the signal received from the user via the operating system, and the control key was pressed when the selection was made, as signaled by the operating as described above, application manager 212 indicates to user interface manager 242 that the control key was pressed at the time of selection of the new program.

User interface manager 242 receives the name of the newly selected program and the control key status from application manager 212 and determines the filename corresponding to the name of the application corresponding to the selected program or program component using the information provided by program identifier 244 as described above and conventional search and comparison methods. For purposes of example, the application running at the time the user makes the selection is application 233 and the user selects the program or program component that has application 239 as a part of the program. User interface manager 242 then provides application initiation manager 250 with the filename corresponding to the name of application 239 corresponding to the newly selected program and the control key status.

Application initiation manager 250 receives the filename and control key status and signals application manager 212 to launch the selected application 239. If the control key status indicates that the control key was not pressed at the time the user selected the application 233, application initiation manager 250 indicates to application manager 212 to launch the application 239 corresponding to the selected program in the same window as the currently running application. If the control key status indicates that the control key was pressed during the selection, application initiation manager 250 indicates to application manager 212 to launch the application corresponding to the selected program in a new application window (not shown) in display 210.

Application manager 212 receives the signal and indication and application filename from application initiation manager 250 and proceeds to display the application 239 corresponding to the selected application if the application is not already running. In one embodiment, application manager 212 maintains a list of applications currently running, and if the application is already running, application manager 212 does not run it again, but may switch it's status into the topmost application window.

In one embodiment, if the application is to be displayed in a new window as described above, the new window is generated on top of the existing window displaying the original application and application manager 212 displays the application 239 corresponding to the selected program in that new window.

Application Receives and Processes the Data

When application manager 212 receives the signal from application initiation manager 250, application manager 212 also obtains from the operating system the handle to the window into which the application is running or will run. When application manager 212 has obtained the handle to the window, application manager 212 provides application initiation manager 250 with the window handle. Any other identifier of the application may be used in place of the window handle.

Application initiation manager 250 receives the handle to the window from application manager 212 and provides the handle to data provider 252.

Data provider 252 receives the window handle from application initiation manager 250 and retrieves the selected data and corresponding data type from the selected data record in data type storage 226 described above via the operating system. When data provider 252 has retrieved the selected data and data type as described above, data provider 252 provides the handle to the window, the selected data, and the corresponding data type to application manager 212. In one embodiment, the identifier of the selected program component is also provided by data provider 252 to application manager 212.

Application manager 212 receives the information described above from data provider 252 and provides the selected data and the identifier of its corresponding data type (and optionally, the identifier of the selected program component) to the application 239 in the window corresponding to the handle provided by data provider 252.

The application 239 of the newly selected program receives the information from application manager 212 and proceeds to process the data. In one embodiment, application 239 processes the data according to its type identifier, such as by parsing it in accordance with the format indicated by the type identifier. In one embodiment, application 239 displays the data, and/or provides it to one or more pods corresponding to the same program as the application or to one or more agents corresponding to the same program as the application, and the provision of the data may be in accordance with the identifier of the program element application 239 optionally receives. Such one or more pods may display the data or a portion thereof, and such agents may provide the data or a portion thereof. Application 239 or its corresponding pods may change the display of other data in response to the data and type received.

Auto Blast

In one embodiment, when the user signals application manager 212 as described above, the user may provide a special signal, such as by holding down the control key while clicking the icon. In such embodiment, when application manager 212 signals user interface manager 242, it indicates whether the user had provided the special signal. If the user had not provided the special signal, the operation of system 200 proceeds as described above.

If user interface manager 242 receives the indication that the special signal had been received, system 200 initially operates as described above until user interface manager 242 receives the identifiers of the programs or program components that are registered as being able to interpret the selected data type. However, instead of allowing the user to select a program or program component, because of the indication that the special signal had been received, user interface manager 242 provides the identifiers of the programs or program components to communication manager 264 with a command that the selected data and its type should be provided to all such programs or their components or all such running programs or their components, and communication manager 264 forwards the command to application manager 212.

Application manager 212 provides the identifiers of all of the programs or the program components received from user interface manager 242 and handles for all the applications for such programs or program components to data provider 252. In one embodiment, all such applications are launched by application manager 212 as described above if they are not already running. Data provider 252 provides the data, type, and, optionally, for each application of a program, the identifiers of the program components it receives from application manager 212. Each such program interprets and processes the data according to its type, and optionally in accordance with the identifiers of the program components as described above.

Other Features

In one embodiment, programs register to a web service the type of data their components can process and the user can select data as described above, press a user interface element, and view a list of programs having at least one element that can process that type of data. If the user makes a selection, the program is installed, and the data is provided to it as described above.

In one embodiment, the system and method may display and allow the selection of an installed program or installation of a program that can provide data of the selected type, instead of, or in addition to, those that can receive and process such data.

Methods.

Figure 3:
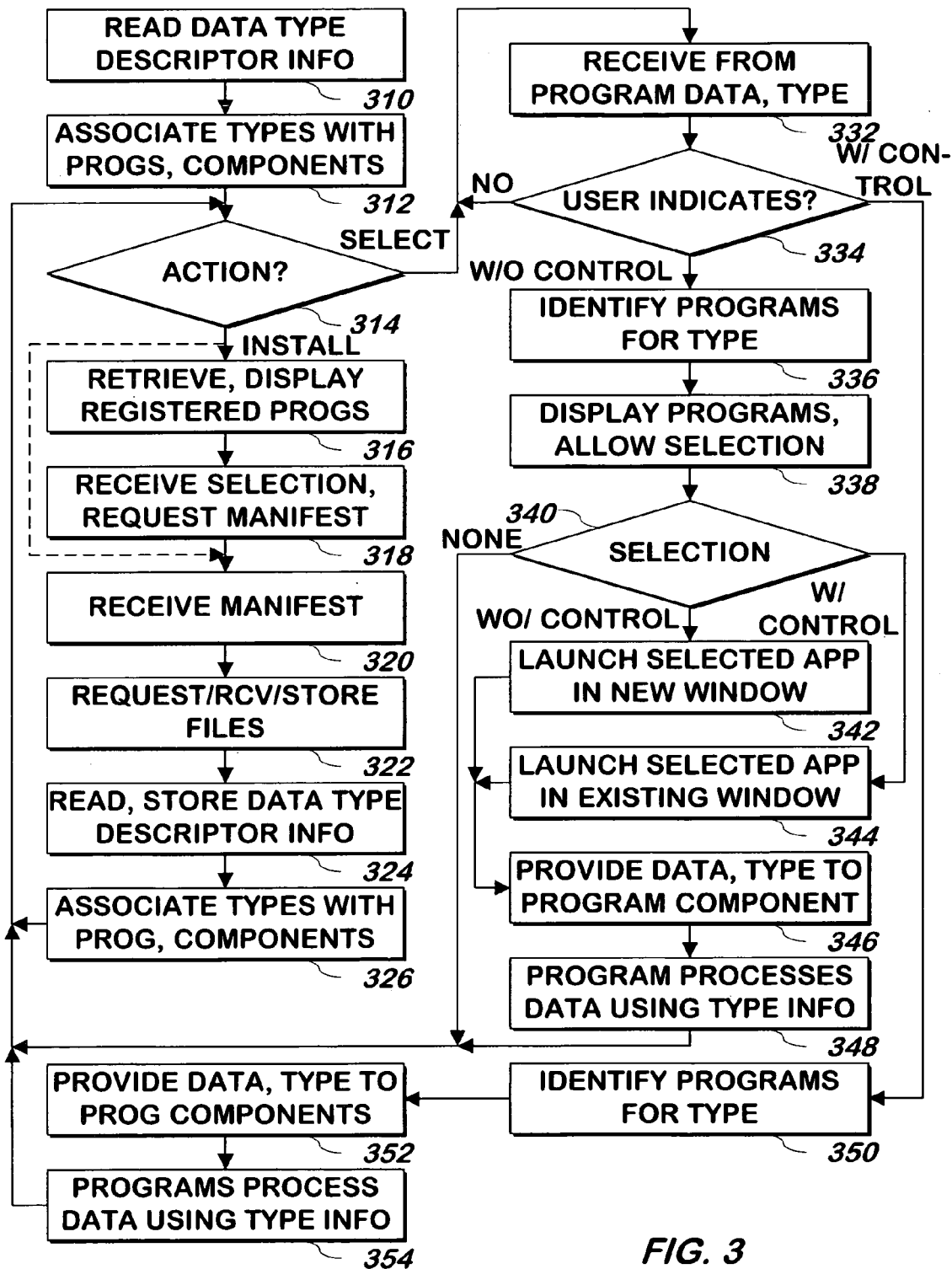
FIG. 3 is a flowchart illustrating a method of communicating data between two or more progams according to one embodiment of the present invention.

Referring now to FIG. 3, a method of communicating data between different programs is shown according to one embodiment of the present invention. Data type descriptor information is read 310, having been supplied by an author of zero or more programs and the data types that each program can accept is associated 312 with each program that can accept that data type as described above. In one embodiment, each of the programs may contain various components and the data types that each component can accept are associated with the components of the program as part of step 312. Data types are freely definable, without restriction, by any component of a computer system on which the method may be performed.

There are many actions the user can take after step 312 is performed. Two such actions are to select data in a program or install another program. If the user chooses to install another program 314, in one embodiment, a list of registered programs is displayed 316 and a selection is received from the user and a manifest is requested and the method continues at step 320. In another embodiment, illustrated by the dashed line in the Figure, step 320 follows the install branch of step 314, such as in the case that a user clicks on a link to install a program.

At step 320, a manifest is received and files corresponding to the manifest are requested, received and stored as described above 322. One of the files is a data type descriptor file containing data type descriptor information and that file is read 324, and data types in the file are associated with the newly installed program, some or all of its components or both, as set forth in the data type descriptor file, and the method continues at step 314.

If, at step 314, the action is the user selection of data in a program, the program in which the data was selected provides the data and its type, which is received 332. If the user indicates that the data is to be provided to another program but does not hold down the control key or otherwise indicate that the data is to be provided to multiple programs 334, one or more programs associated, in steps 312, 326 or both, with the type of data received in step 332 are identified 336, the names or other indications of the programs are displayed and a selection is allowed to be made 338.

If the user does not make a selection, the method continues at step 314. If the user makes a selection of one of the programs displayed in step 338 and does not hold down the control key or otherwise indicate 340, the application corresponding to the selected program is launched 342 in a new window, different from the window of an existing application 342 and the method continues at step 346. If the user makes a selection of one of the programs displayed in step 338 and holds down the control key or otherwise indicates 340, the application corresponding to the selected program is launched 344 in a window already displaying another application 344 and the method continues at step 346. Steps 342, 344 or both, may include the determination as to whether the application is already running, at which point it is not run again, but may be displayed as the front-most window.

At step 346, the data and type is provided to the program component corresponding to the selection made and the program processes the data in accordance with the type provided to it 348 and the method continues at step 314.

If the user indicates that the data is to be provided to another program and holds down the control key or otherwise indicate that the data is to be provided to multiple programs 334, one or more programs associated, in steps 312, 326 or both, with the type of data received in step 332 are identified 350 and the data and type (and optionally identifiers of all such components) are provided to the applications of all such programs (all such programs that have running applications in one embodiment, or all such programs in another embodiment, with programs having non-running applications being launched in another embodiment) 352 and all such programs receive and process the data in accordance with the type information provided with the data 354 in the same manner as step 348 and the method continues at step 314.

In one embodiment, when the user indicates, the currently displayed programs or program components that can accept the type of the selected data are highlighted, such as by causing their borders to glow.

What is claimed is:

1. A method of providing data from a program in a plurality of programs to at least one other program in the plurality of programs, the method, performed by a processor of a computer, comprising:
   receiving, for each of the plurality of programs, an identifier of each such program and at least one identifier of at least one type of data each such program can receive;
   storing, relative to each of the plurality of programs, the identifier of each such program and the at least one identifier of the at least one type of data each such program can receive;
   obtaining, relative to the at least one type of data and the program in the plurality of programs, a data selection command via a user interface;
   receiving, in response to the obtained data selection command, data of a multi-part data structure associated with the data selection command and an identifier of a type of data for the data of the multi-part data structure associated with the data selection command, which data of the multi-part data structure associated with the data selection command is to be provided from the program in the plurality of programs;
   identifying and providing a list of programs including the at least one other program in the plurality of programs for which the at least one identifier of the at least one type of data each such program can receive matches the identifier of the type of data for the data of the multi-part data structure associated with the data selection command received;
   receiving a selection of the at least one other program in the plurality of programs from the list of programs; and
   providing the data of the multi-part data structure associated with the data selection command received to the at least one other program in the plurality of programs selected.

2. The method of claim 1, additionally comprising:
   receiving an indication that the at least one other program in the plurality of programs selected should be opened in a new window; and
   opening the at least one other program in the plurality of programs selected in a window not opened at the time the indication was received that the at least one other program in the plurality of programs selected should be opened in a new window.

3. The method of claim 1, wherein the data of the multi-part data structure associated with the data selection command is provided to all of the at least one other program in the plurality of programs identified in the list of programs.

4. The method of claim 1, wherein the at least one identifier of the at least one type of data each such program can receive is received in XML (Extensible Markup Language) format.

5. A computer program product comprising a computer useable medium having computer readable program code embodied therein for providing data from one of a plurality of programs to at least one other program in the plurality of programs, the computer program product comprising computer readable program code devices configured to cause a computer system to:
   receive, for each of the plurality of programs, an identifier of each such program and at least one identifier of at least one type of data each such program can receive;
   store, relative to each of the plurality of programs, the identifier of each such program and the at least one identifier of the at least one type of data each such program can receive;
   obtain, relative to the at least one type of data and the one of the plurality of programs, a data selection command via a user interface;
   receive, in response to the obtained data selection command, data of a multi-part data structure associated with the data selection command and an identifier of a type of data for the data of the multi-part data structure associated with the data selection command, which data of the multi-part data structure associated with the data selection command is to be provided from the one of the plurality of programs;
   identify and provide a list of programs including the at least one other program in the plurality of programs for which the at least one identifier of the at least one type of data each such program can receive matches the identifier of the type of data for the data of the multi-part data structure associated with the data selection command received;
   receive a selection of the at least one other program in the plurality of programs from the list of programs; and
   provide the data of the multi-part data structure associated with the data selection command received to the at least one other program in the plurality of programs selected.

6. The computer program product of claim 5, additionally comprising computer readable program code devices configured to cause the computer system to:
   receive an indication that the at least one other program in the plurality of programs selected should be opened in a new window; and
   open the at least one other program in the plurality of programs selected in a window not opened at the time the indication was received that the at least one other program in the plurality of programs selected should be opened in a new window.

7. The computer program product of claim 5, wherein the data of the multi-part data structure associated with the data selection command is provided to all of the at least one other program in the plurality of programs identified in the list of programs.

8. The computer program product of claim 5, wherein the at least one identifier of the at least one type of data each such program can receive is received in XML (Extensible Markup Language) format.

9. A system for providing data from a program in a plurality of programs to at least one other program in the plurality of programs, the system comprising:
   a storage device operable to store software instructions;
   a user interface; and
   a processor operable to interact with the user interface, for receiving input, and with the storage device, to retrieve and execute software instructions embodying modules comprising:
   an initialization manager having an input for receiving, for each of the plurality of programs, an identifier of each such program and at least one identifier of at least one type of data such program can receive, the initialization manager for storing, relative to each of the plurality of programs, the identifier of each such program and the at least one identifier of the at least one type of data each such program can receive, and for providing at an output the identifier of each such program and the at least one identifier of the at least one type of data each such program can receive;

a selected data manager having an input for obtaining, relative to the at least one type of data and the program in the plurality of programs, a data selection command via the user interface, and for receiving, in response to obtaining the data selection command, data of a multi-part data structure associated with the data selection command and an identifier of a type of data for the data of the multi-part data structure associated with the data selection command to be provided from the program in the plurality of programs, the selected data manager for providing at an output the data of the multi-part data structure associated with the data selection command and said the identifier of the type of data for the data of the multi-part data structure associated with the data selection command;

a program identifier having a first input coupled to the initialization manager output for receiving the at least one identifier of the at least one type of data each such program can receive; the program identifier for identifying the at least one other program in the plurality of programs for which the at least one identifier of the at least one type of data each such program can receive matches the identifier of the type of data for the data of the multi-part data structure associated with the data selection command received, and for providing at an output the identifier of each of the at least one other program in the plurality of programs identified; and a data provider having a first input coupled to the program identifier output for at least one of the at least one other program in the plurality of programs identified and a second input coupled to the selected data manager output, the data provider for providing at an output the data of the multi-part data structure associated with the data selection command from the selected data manager to at least one of the at least one other program in the plurality of programs identified at the data provider first input.

10. The system of claim 9:

additionally comprising a user interface manager having a first input coupled to the program identifier output for receiving the identifier of each of the at least one other program in the plurality of programs identified by the program identifier, and a second input operatively coupled for receiving input from a user, the user interface manager for providing to a user at a first output coupled to a display a list of programs including the at least one other program in the plurality of programs for which the at least one identifier of the at least one type of data each such program can receive matches the identifier of the type of data for the data of the multi-part data structure associated with the data selection command received, and receiving from the user via the user interface manager having a second input a selection of one of the programs on the list and for providing at a second output the identifier of the one of the programs selected; and wherein the data provider additionally has a selection input coupled to the user interface manager second output for receiving the identifier of the one of the programs selected, and the data provider provides the data of the multi-part data structure associated with the data selection command at the data provider output to the at least one of the at least one other program in the plurality of programs identified at the data provider first input by providing the data of the multi-part data structure associated with the data selection command at the data provider output to the one of the programs selected in the at least one other program in the plurality of programs identified.

11. The system of claim 10:

wherein the user interface manager second input is additionally for receiving from the user a first indication that the one of the programs selected should be opened in a new window, and the user interface manager is additionally for providing at the user interface manager second output a second indication responsive to the first indication; and additionally comprising an application initiation manager having an input coupled to the user interface manager second output for receiving the second indication and the identifier of the one of the programs selected, the application initiation manager for opening via an output the one of the programs selected in a window that was not opened at the time the user interface manager second input received the first indication.

12. The system of claim 9, wherein the data provider provides the data of the multi-part data structure associated with the data selection command at the data provider output to all of the at least one other program in the plurality of programs identified.

13. The system of claim 9, wherein the at least one identifier of the at least one type of data each such program can receive is received in XML (Extensible Markup Language) format.

* * * * *